(12) United States Patent
Nahm et al.

(10) Patent No.: US 12,326,619 B2
(45) Date of Patent: Jun. 10, 2025

(54) UV AND HIGH ENERGY VISIBLE ABSORBING OPHTHALMIC LENSES

(71) Applicant: HOYA OPTICAL LABS OF AMERICA, INC., Lewisville, TX (US)

(72) Inventors: Steven Harold Nahm, Ramsey, MN (US); Richard Blacker, Ramsey, MN (US); David Kissel, Ramsey, MN (US); David Olund, Ramsey, MN (US)

(73) Assignee: HOYA OPTICAL LABS OF AMERICA, INC., Lewisville, TX (US)

( * ) Notice: Subject to any disclaimer, the term of this patent is extended or adjusted under 35 U.S.C. 154(b) by 0 days.

(21) Appl. No.: 18/438,288

(22) Filed: Feb. 9, 2024

(65) Prior Publication Data

US 2024/0184145 A1 Jun. 6, 2024

Related U.S. Application Data

(63) Continuation of application No. 17/819,272, filed on Aug. 11, 2022, now Pat. No. 12,007,629, which is a
(Continued)

(51) Int. Cl.
*G02C 7/10* (2006.01)
*B29C 35/08* (2006.01)
(Continued)

(52) U.S. Cl.
CPC .......... *G02C 7/108* (2013.01); *B29C 35/0805* (2013.01); *B29D 11/00009* (2013.01); *B32B 7/12* (2013.01); *B32B 27/08* (2013.01); *B32B 27/18* (2013.01); *B32B 27/365* (2013.01); *B32B 27/40* (2013.01); *G02C 7/10* (2013.01); *B29C 2035/0827* (2013.01); *B29D 11/00634* (2013.01); *B29D 11/0073* (2013.01); *B29K 2075/00* (2013.01); *B29K 2105/0002* (2013.01); *B29K 2105/0005* (2013.01); *B32B 2250/02* (2013.01); *B32B 2250/03* (2013.01);
(Continued)

(58) Field of Classification Search
None
See application file for complete search history.

(56) References Cited

U.S. PATENT DOCUMENTS 2,333,051 A 10/1943 Smith
4,108,827 A 8/1978 La Liberte
(Continued)

FOREIGN PATENT DOCUMENTS

CN 101120052 A 2/2008
CN 101328313 A 12/2008
(Continued)

OTHER PUBLICATIONS

China Patent Office, Request for Invalidation, dated Sep. 28, 2023 in Chinese Patent Application No. 201680056413.9, 450 pages.
(Continued)

*Primary Examiner* — Robert E. Tallman
(74) *Attorney, Agent, or Firm* — Inskeep IP Group, Inc.

(57) ABSTRACT

An ophthalmic lens operable to protect the eye from harmful ultraviolet and high energy visible wavelengths of light and methods for producing the same.

16 Claims, 7 Drawing Sheets

Related U.S. Application Data continuation of application No. 17/094,652, filed on Nov. 10, 2020, now Pat. No. 11,442,293, which is a continuation of application No. 15/280,995, filed on Sep. 29, 2016, now Pat. No. 10,866,434.

(60) Provisional application No. 62/234,543, filed on Sep. 29, 2015.

(51) Int. Cl.

| | | |
|---|---|---|
| *B29D 11/00* | (2006.01) | |
| *B32B 7/12* | (2006.01) | |
| *B32B 27/08* | (2006.01) | |
| *B32B 27/18* | (2006.01) | |
| *B32B 27/36* | (2006.01) | |
| *B32B 27/40* | (2006.01) | |
| *B29K 75/00* | (2006.01) | |
| *B29K 105/00* | (2006.01) | |

(52) U.S. Cl.
CPC ....... *B32B 2250/24* (2013.01); *B32B 2307/21* (2013.01); *B32B 2307/40* (2013.01); *B32B 2307/4026* (2013.01); *B32B 2307/412* (2013.01); *B32B 2307/42* (2013.01); *B32B 2307/71* (2013.01); *B32B 2307/73* (2013.01); *B32B 2307/732* (2013.01); *B32B 2551/00* (2013.01); *G02C 2202/16* (2013.01)

(56) References Cited

U.S. PATENT DOCUMENTS

| | | |
|---|---|---|
| 4,139,694 A | 2/1979 | Laliberte |
| 4,422,721 A | 12/1983 | Hahn et al. |
| 4,793,669 A | 12/1988 | Perilloux |
| 4,896,928 A | 1/1990 | Perilloux et al. |
| RE33,729 E | 10/1991 | Perilloux |
| 5,059,561 A | 10/1991 | Ciolek et al. |
| 5,177,509 A | 1/1993 | Johansen et al. |
| 5,182,588 A | 1/1993 | Maurer et al. |
| 5,371,138 A | 12/1994 | Schaefer et al. |
| 5,400,175 A | 3/1995 | Johansen et al. |
| 5,470,932 A | 11/1995 | Jinkerson |
| 5,719,705 A | 2/1998 | Machol |
| 5,751,481 A | 5/1998 | Dalzell et al. |
| 5,798,182 A | 8/1998 | LeFebvre et al. |
| 5,922,246 A | 7/1999 | Matsushita et al. |
| 5,926,248 A | 7/1999 | Tucker |
| 5,949,518 A | 9/1999 | Belmares et al. |
| 6,419,873 B1 | 7/2002 | Buazza et al. |
| 6,464,484 B1 | 10/2002 | Powers et al. |
| 6,486,226 B2 | 11/2002 | Al-Akhdar et al. |
| 6,557,734 B2 | 5/2003 | Buazza et al. |
| 6,632,535 B1 | 10/2003 | Buazza et al. |
| 6,634,879 B2 | 10/2003 | Buazza et al. |
| 6,641,261 B2 | 11/2003 | Wang et al. |
| 6,770,692 B1 | 8/2004 | Kobayashi et al. |
| 6,777,459 B2 | 8/2004 | Al-Akhdar et al. |
| 6,926,510 B2 | 8/2005 | Buazza et al. |
| 6,939,899 B2 | 9/2005 | Buazza et al. |
| 6,960,312 B2 | 11/2005 | Powers et al. |
| 6,964,479 B2 | 11/2005 | Buazza et al. |
| 7,044,429 B1 | 5/2006 | Foreman et al. |
| 7,079,920 B2 | 7/2006 | Buazza et al. |
| 7,144,598 B2 | 12/2006 | Moravec et al. |
| 7,169,702 B2 | 1/2007 | El-Hibri |
| 7,278,737 B2 | 10/2007 | Mainster et al. |
| 8,004,764 B2 | 8/2011 | Artsyukhovich et al. |
| 8,106,108 B2 | 1/2012 | Chen |
| 8,133,414 B2 | 3/2012 | Gallas et al. |
| 8,403,558 B2 | 3/2013 | Fuchs et al. |
| 8,469,512 B2 | 6/2013 | Croft et al. |
| 8,541,526 B2 | 6/2013 | Jethmalani et al. |
| 9,057,887 B1 | 6/2015 | Jaglan |
| 9,993,635 B2 | 4/2018 | Hashimoto et al. |
| 2005/0009964 A1 | 1/2005 | Sugimura et al. |
| 2005/0233153 A1 | 10/2005 | Qin et al. |
| 2006/0039070 A1 | 2/2006 | Sugimura et al. |
| 2007/0092830 A1* | 4/2007 | Lai .............. C08F 226/10 430/270.1 |
| 2007/0225470 A1 | 9/2007 | Di et al. |
| 2009/0130489 A1 | 5/2009 | Stollwerck et al. |
| 2009/0141357 A1 | 6/2009 | Kamura et al. |
| 2009/0189303 A1 | 7/2009 | Diggins et al. |
| 2010/0014144 A1 | 1/2010 | Ota |
| 2010/0135353 A1 | 6/2010 | Fuchs et al. |
| 2012/0008217 A1* | 1/2012 | Ishak .............. A61K 8/58 359/722 |
| 2012/0075577 A1 | 3/2012 | Ishak et al. |
| 2013/0201441 A1 | 8/2013 | Chui et al. |
| 2013/0222913 A1 | 8/2013 | Tomoda et al. |
| 2015/0370094 A1 | 12/2015 | Hashimoto et al. |
| 2017/0174983 A1 | 6/2017 | Odeh et al. |
| 2017/0174986 A1 | 6/2017 | Sumino et al. |

FOREIGN PATENT DOCUMENTS

| | | |
|---|---|---|
| CN | 101652448 A | 2/2010 |
| CN | 102858863 A | 1/2013 |
| CN | 104903754 A | 9/2015 |
| CN | 105612220 A | 5/2016 |
| CN | 108139607 | 6/2018 |
| EP | 0145201 A1 | 6/1985 |
| JP | 2014231592 A | 12/2014 |
| WO | WO 2014133111 A1 | 9/2014 |
| WO | WO 2015/046540 A1 | 4/2015 |

OTHER PUBLICATIONS

European Patent Office, Summons to attend oral proceedings pursuant to Rule 115(1) EPC dated Oct. 26, 2022 in European Patent Application No. 16852641.6, 113 pages.

National Intellectual Property Administration, PRC, Office Action Feb. 5, 2020 in Chinese Patent Application No. 201680056413.9, 8 pages.

European Patent Office, Supplementary European Search Report dated Jul. 12, 2019 in European Patent Application No. 16852641.6, 16 pages.

National Intellectual Property Administration, PRC, Office Action May 8, 2019 in Chinese Patent Application No. 201680056413.9, 8 pages.

Inapi Chile, Examiner's Report mailed Apr. 15, 2019 in Chilean Patent Application No. 201800779, 16 pages.

European Patent Office, Partial European Search Report dated Mar. 20, 2019 in European Patent Application No. 16852641.6, 14 pages.

Inapi Chile, Examiner's Report mailed Jan. 9, 2019 in Chilean Patent Application No. 201800779, 19 pages.

Anonymous, "Beer-Lambert law—Wikipedia," XP055352410, Retrieved from the Internet <URL:https://en.wikipedia.org/wiki/Beer-Lambert_law#History > [originally retrieved on Mar. 7, 2017. submitted herewith as retrieved Dec. 21, 2022].

Jianmin, Ren, et al., Cover Page, Table of Contents and pp. 176-179, *Analytical Chemistry*, ISBN: 9787122189523, Chemical Industry Press, Feb. 2014.

European Patent Office, Extended European Search Report dated Jun. 21, 2024 in European Patent Application No. 24163088.8, 10 pages.

\* cited by examiner

Ground State      Excited State      Betaine

Ground State      Excited State

Fig. 14
| λ, nm | UVB %T 280-315 | UVA %T 315-400 | HEV %T 380-500 | AS/NZS 1067-2003 280-400 | %T₄₀₀ 400 | Blue Light %T 400-500 | BLB 100/BL%T | EPF 380-500 | Luminous 380-780 | L* | a* | b* | YI | Chromaticity Coordinates |   |
|---|---|---|---|---|---|---|---|---|---|---|---|---|---|---|---|
|   |   |   |   |   |   |   |   |   |   | 2°/ASTM D65 | | | D1925 | D65 X | D65 Y |
| Wafers | 0.01 | 0.01 | 67.13 | Pass | 7.23 | 85.61 | 1.17 | 1.17 | 89.75 | 95.83 | -0.36 | 1.52 | 2.38 | 0.315 | 0.332 |
| Lenses | 0.02 | 0.01 | 65.28 | Pass | 1.80 | 84.79 | 1.18 | 1.18 | 90.06 | 96.01 | -0.92 | 1.74 | 2.50 | 0.315 | 0.333 |
Fig. 15
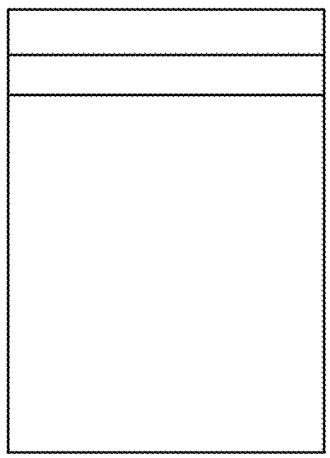
Fig. 16
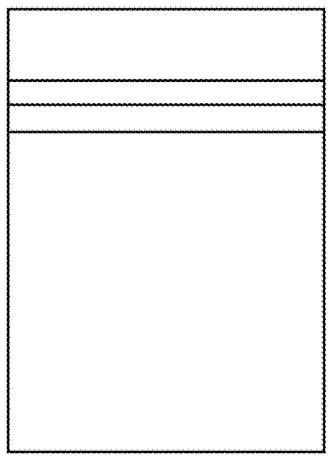

UV AND HIGH ENERGY VISIBLE ABSORBING OPHTHALMIC LENSES

RELATED APPLICATIONS

This application is a continuation of U.S. patent application Ser. No. 17/819,272 filed Aug. 11, 2022 entitled UV And High Energy Visible Absorbing Ophthalmic Lenses, which is a continuation of and claims priority to U.S. patent application Ser. No. 17/094,652 filed Nov. 10, 2020 entitled UV And High Energy Visible Absorbing Ophthalmic Lenses (now U.S. Pat. No. 11,442,293 issued Sep. 13, 2022), which is a continuation of and claims priority to U.S. patent application Ser. No. 15/280,995 filed Sep. 29, 2016 entitled UV and High Energy Visible Absorbing Ophthalmic Lenses (now. U.S. Pat. No. 10,866,434 issued Dec. 15, 2020), which claims benefit of and priority to U.S. Provisional Application Ser. No. 62/234,543 filed Sep. 29, 2015, entitled UV and High Energy Visible Absorbing Ophthalmic Lenses, all of which are hereby incorporated herein by reference in its entirety.

FIELD OF THE INVENTION

The present invention relates to light absorbing filters, e.g. optical films, laminates, and lenses, and more particularly, to optical filters that absorb harmful ultraviolet and/or high energy visible light.

BACKGROUND OF THE INVENTION

It is known in the art to use additives to absorb harmful wavelengths of light, including UV light with wavelengths between 280 nm and 380 nm under ANSI standards and 400 nm under other (AUS/NZ) standards. More recently, it has become apparent that HEV (high energy visible) light which is characterized as having wavelengths from 400 nm up to 500 nm, also poses possible damage threats to living tissues or the eyes. This light range has also been attributed to other biological factors such as impacts on circadian rhythms.

As the absorbed wavelengths of light begin to ingress upon the visible light wavelengths, the result is a visible coloration that under most circumstances is undesirable and due to the blocking of predominantly blue wavelengths, results in a yellow colour or transmission through the absorbing article.

In general terms, the lower the wavelength of the light, the higher the energy of the photon, and so the greater the possible cellular damage. Light in these wavelengths carries sufficient energy to break chemical bonds, causing damage to the substrates that absorb this light. These substrates can be of biological origin or other so called organic materials, the latter being defined as compounds consisting predominately of carbon based materials such as synthetic polymers used ubiquitously to make articles of commercial value.

When bonds within inanimate substrates are broken, the primary effect is characterized as a loss of mechanical properties or a change in colour. When bonds within living biological tissue are broken, the tissue damage manifests in a degradation or loss of function that can include lesions and burns, damage to genetic material, degradation of vision, and so forth, effects generally leading to decline of the organism's health and potentially shortening its life.

The same types of additives that find use in protection of non-living materials can also be effective in protection of living tissue. For example, materials known as sun-screens are widely sold as lotions and creams for topical application to exposed skin tissue, absorbing the harmful rays from the sun and protecting the exposed skin tissue from damage.

Compounds most useful in protection against harmful UV and HEV radiation strongly absorb light in these damaging wavelengths, and typically contain one or more structural features with extended π-electron clouds, more accurately described as compounds with formal unsaturation or multiple bonds between individual adjacent atoms alternately separated by single bonds between adjacent atoms. Generic structures meeting this broad description generally contain so-called aromatic groups, the parent structure being represented by benzene. Other arrays of atoms can serve as the basis for their structures, including extended linear or cyclic arrays of alternating carbon to carbon double and single bonds, particularly where one or more carbon atoms is replaced by a heteroatom such as nitrogen, oxygen or sulphur. The wavelengths absorbed by these structures can be tuned by the number, type, and arrangement of the constituent atoms, including adjoined (fused) rings and the presence of substituent heteroatoms not involved in the extended system of multiple bonds, which atoms possess unshared (lone or non-bonding) pairs of electrons. Such heteroatoms include but are not limited to nitrogen, oxygen and sulfur, and halogens, particularly chlorine.

The most useful structures for UV and HEV absorption have a mechanism whereby they can harmlessly "dump" the energy they absorb from the incident light by a reversible transformation of the electronic excited state formed (by light absorption) as heat through atomic motion, more correctly, through transfer of a neutral hydrogen atom (H) or a proton ($H^+$), from one bonding partner to another, for example between oxygen and nitrogen appropriately arrayed in space, by a process known as tautomerization, a formal rearrangement of atoms and electrons through shifting of single and double bonds. An example of such tautomerization is shown in FIG. 1

In the above example, the hydrogen atom transfers from the oxygen atom in the ground state to the neighbouring nitrogen atom in the excited state, accompanied by a shift of π-electrons, and back again with liberation of heat and resulting in no net change to the original structure. Such hydrogen atom transfers or migrations are thought to occur because of increased acidity of the group containing the hydrogen atom in the excited state, such that the basicity of the neighboring heteroatom is strong enough to abstract the hydrogen atom or proton to form a new neutral structure, which may also be represented as one in which there are neighbouring opposite charges in the structure, also called a betaine. Other structures can be drawn where the hydrogen atom transfers in the opposite sense from a nitrogen atom in the ground state to an oxygen atom in the excited state and between two appropriately positioned oxygen or nitrogen atoms.

Other structures are known where the likely energy conversion is accomplished by breaking of a double bond to form two adjacent stabilized radicals, allowing "free" rotation of the newly generated single bond between these two adjacent free radical centers, with ultimate reformation of the double bond and again, with no net change to the molecular structure. An example of such reaction is shown in FIG. 2.

Such materials can be used separately or in combination with an array of different substituents around the structure, which substituents are selected on the basis of their ability to modify the wavelengths of light absorbed, the stability of the excited state intermediates, and their effects on the solubility or compatibility of the resultant ground state structures in or with the media in which they are dissolved. There is a wide range of commercially available compounds possessing these key reversible structural characteristics, sold as stabilizing additives.

However, there is a need in the ophthalmic field for optimization of eye protection against harmful UV and HEV light in eye wear that is cosmetically acceptable or desirable and, hence, commercially successful.

OBJECTS AND SUMMARY OF THE INVENTION

The present invention provides for the optimization of eye protection against harmful UV and HEV light in eye wear that is cosmetically acceptable or desirable. These objectives are, in part, achieved through providing an ophthalmic article comprising a light absorbing layer having a weight percent of a light absorbing compound in the range of 0.1 to 10 and a transmittance of no more than 50 percent of light having wavelengths of up to 443 nm.

In certain embodiments of the present invention, the light absorbing layer has a weigh percent of a light absorbing compound of up to 3 or of up to 1. In certain embodiments of the present invention, the light absorbing layer has a thickness of greater than 1 mm or 0.01 to 1 mm. In certain embodiments of the present invention, the light absorbing layer has a transmittance of no more than 50 percent of light having wavelengths of up to 410 nm. In certain embodiments of the present invention, the light absorbing layer is a monolithic film, an adhesive layer of a laminate, a component of a composite ophthalmic lens, a thermoplastic resin, or a curable composition.

These objectives are, in part, further achieved through providing a method for forming an ophthalmic article comprising: determining a target transmittance of light below a wavelength of 450 nm for the ophthalmic article; determining a target range of thickness of the ophthalmic article; adding a weight percent of a light absorbing compound to a medium based upon the target transmittance, the target range of thickness, and a target CIE color coordinate for the ophthalmic article; and forming the ophthalmic article with medium containing the light absorbing compound.

In certain embodiments of the present invention, the determining a target transmittance comprises determining a target transmittance of less than 50 percent or determining a transmittance of not more than 50 percent of light having a wavelength of up to 410 nm. In certain embodiments of the present invention, determining a target range of thickness comprises determining a thickness of greater than 1 mm or a thickness in the range of 0.01 to 1 mm. In certain embodiments of the present invention, the adding a weight percent of a light absorbing compound to a medium comprises adding a weigh percent of the light absorbing compound in the range of 1 to 10. In certain embodiments of the present invention, the forming the ophthalmic article comprises forming the ophthalmic article through injection molding of a molten thermoplastic, forming the ophthalmic article through curing of a curable composition, or forming of a composite ophthalmic article having a layer of the medium containing the light absorbing compound.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIG. 14 is a table showing certain optical characteristics of laminates containing a light absorbing compound and for lenses employing the same according to certain embodiments of the present invention.

FIG. 15 is a partial cross-sectional view of an optical article according to certain embodiments of the present invention.

FIG. 16 is a partial cross-sectional view of an optical article according to certain embodiments of the present invention.

DESCRIPTION OF EMBODIMENTS

Figure 1:
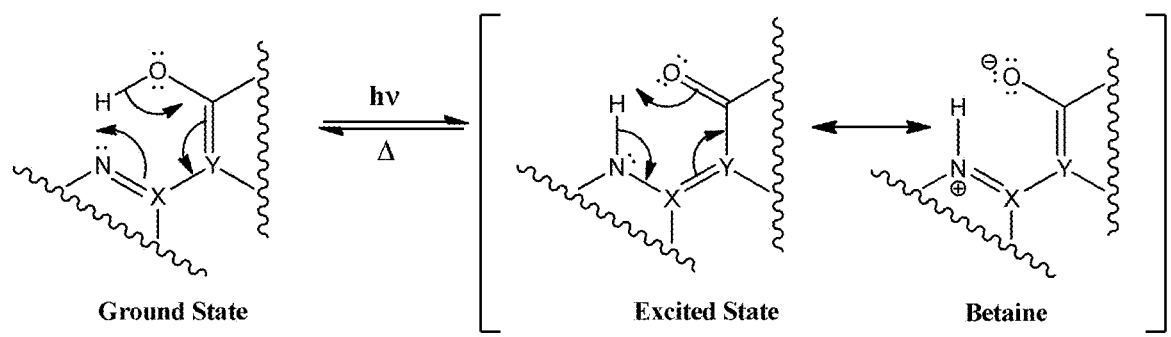
FIG. 1 is a diagram showing a chemical transformation of a light absorbing compound.
Figure 2:
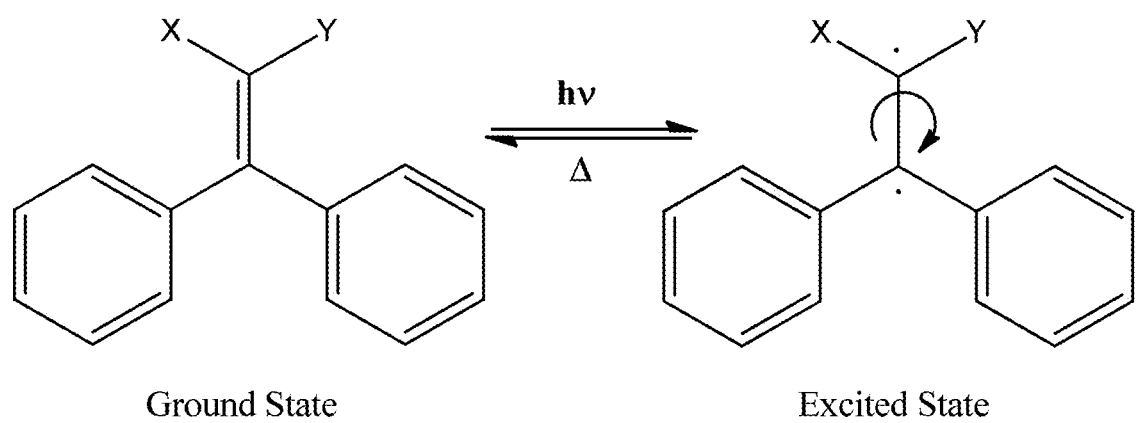
FIG. 2 is a diagram showing a chemical transformation of a light absorbing compound.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally speaking, the present invention relates to eye health and protection of the human eye through absorbance of harmful ultraviolet (UV) and/or high energy visible (HEV, i.e. blue) light by additives present in the lens materials of construction, including as components within an adhesive layer in a laminate contained within a composite lens, as components within a monolithic sheet used by itself or as part of a laminate or non-laminate structure within a composite lens, added to thermoplastic pellets from which lenses are molded, or added to a curable composition, for example, a thermoset liquid or UV cured monomer compositions or a curable polyurethane based composition, from which lenses are cast. The present invention further relates to light absorbing filters to block damaging photons, while maintaining a good cosmetic appearance with low levels of coloration (or yellowness).

In certain embodiments, light absorbing filters according to the present invention include an absorbing compound, or compounds employed in combination, of the first class of materials described above, i.e. materials subject to tautomerization in which a hydrogen atom transfers from an oxygen atom in a ground state to a neighbouring nitrogen atom in an excited state. For example, compounds which function by the hydrogen atom transfer mechanism include hydroxyphenyl benzotriazoles, exemplified by 2-(3'-tert-butyl-2'-hydroxy-5'-methylphenyl)-5-chlorobenzotriazole (CAS #: 3896-11-5), available commercially as Tinuvin 326 or Omnistab 326; or pyrrolo[3,4-f]benzotriazole-5,7(2H,6H)-dione, 6-butyl-2-[2-hydroxy-3-(1-methyl-1-phenylethyl)-5-(1,1,3,3-tetramethylbutyl)phenyl]-(CAS #945857-19-2) available commercially as Tinuvin CarboProtect; hydroxyphenyl triazines exemplified by 2-(4,6-diphenyl-1,3,5-triazin-2-yl)-5-[(hexyl)oxy]-phenol, (CAS #147315-50-2) available commercially as Tinuvin 1577; or the mixture of 2-[4-[2-hydroxy-3-tridecyl (and dodecyl) oxypropyl]oxy]-2-hydroxyphenyl]-4,6-bis(2,4-dimethylphenyl)-1,3,5-triazine (CAS #153519-44-9) available commercially as Tinuvin 400; and hydroxybenzophenones exemplified by 2-hydroxy-4-octyloxybenzophenone (CAS #1843-05-6) available commercially as Uvinul 3008; or 2,2'-dihydroxy-4,4'-dimethoxy benzophenone (CAS #131-54-4) available commercially as Uvinul D49 and Cyasorb UV.

In certain embodiments, light absorbing filters according to the present invention include an absorbing compound, or compounds employed in combination, of the second class of materials described above, i.e. materials subject to the breaking of a double bond to form two adjacent stabilized radicals. Two principle examples of materials of this second class that function by formation of two adjacent stabilized free radical centers from a carbon to carbon double bond allowing the resultant single bond to dissipate energy through rotation, known as diaryl cyanoacrylates include ethyl-2-cyano-3,3-diphenylacrylate (CAS #5232-99-5) commercially available as Uvinul 3035; and 1,3-bis-[(2'-cyano-3',3'-diphenylacryloyl)oxy]-2,2-bis-{[(2'-cyano-3',3'-diphenylacryloyl)oxy]methyl}-propane (CAS #178671-58-4) commercially available as Uvinul 3030. This second class of materials tends to absorb shorter wavelength (higher energy) light than the first class of hydrogen atom transfer light absorbers.

The UV/visible spectrum used to characterize the absorbing properties of molecules is acquired at a fixed path length (1 or 10 mm) and at low molar concentrations (in the range of $10^{-4}$ to $10^{-6}$ moles/liter, depending on the molar extinction coefficient) of the absorber dissolved in a solvent that is transparent in the wavelength region of interest. For organic absorbers of the present invention, the solvent employed is, for example but not limited to, an alcohol (e.g. ethanol), an ether (e.g. tetrahydrofuran), a glycol ether (e.g. propylene glycol monomethyl ether), or a hydrocarbon (e.g. cyclohexane) solvent.

It has been determined that while the efficacy of light absorbance principally depends on an absorber's molecular structure, the efficacy of light absorbance also strongly relates (1) to the absorber's concentration in the medium in which it is dissolved or dispersed and (2) to the light path length through which it is expected to operate. For example, with respect to a given structure, a longer light path length (at a fixed concentration) results in a lower percentage of transmitted incident light. Analogously, a higher concentration of absorber (at a fixed path length) also results in a lower percentage of transmitted incident light. This behavior falls into two regimes, a linear relationship at low concentrations and/or short path lengths, and a nonlinear relationship at high concentrations and/or long path lengths (Beer-Lambert Law; more absorber or a longer path results in lower light transmittance but additional amounts or increased path lengths absorb less than predicted by the line generated at low concentration or short path lengths).

Accordingly, in certain embodiments of the present invention, depending on the technical or commercial application and amount of incident light and wavelength region desired to be removed (filtered out), the concentration of the absorber employed is optimized. For example, in a (transparent) coating (generally limited to less than or equal to 10 microns thick), where the path length is very short, a higher concentration of absorber is required to remove the same amount of incident light than is required for a transparent body of macroscopic thickness (millimeters). It has been found that this concentration is difficult to predict because of the nonlinearity of the absorbing behavior.

Figure 3:
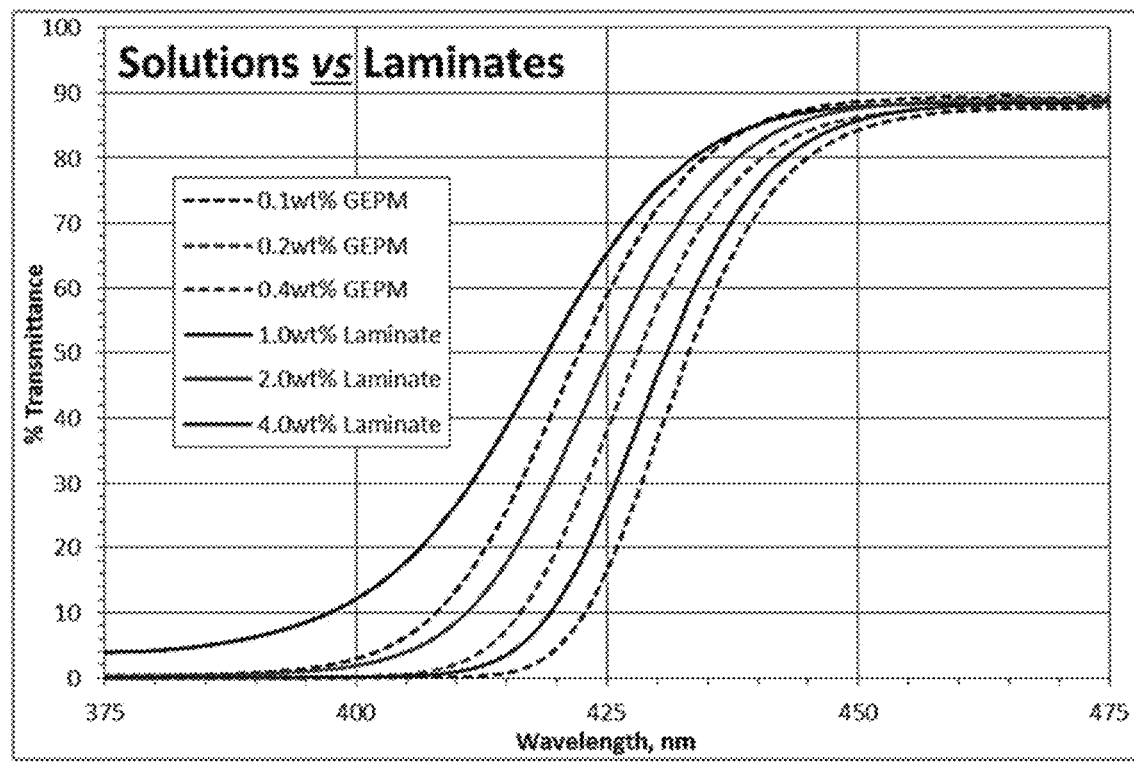
FIG. 3 is a graph showing percent transmittance of different media containing various concentrations of a light absorbing compound according to certain embodiments of the present invention.

This is shown in FIG. 3 which provides a comparison of the behaviour of different concentrations of absorber in GEPM solution, propylene glycol monomethyl ether, having a 1 mm light path to different concentrations of absorber behaviour in a polyurethane laminating adhesive having a 41 µm path. The absorber in GEPM solution results were adjusted to simulate a polycarbonate film in the laminate structure. In other words, the concentration of the absorber in the GEPM solution was adjusted up or down as required by the different absorbers' molar extinction coefficients to absorb the target amount of light below the target cut-off wavelength in the 1 mm path length to observe their spectra and permit estimation of the amount of absorber required in the application.

The laminate samples shown in FIG. 3 were formed of a standard commercial solvent-borne two-part polyurethane formulation into which absorber was added at levels estimated from their solution behaviour at much longer path lengths prior to casting and lamination. The adhesive layer was approximately 41 micrometres in thickness and was supported by polycarbonate film.

As shown in FIG. 3, the absorbance is so strong that as the concentration of the absorber increases, the lower, left shoulder of transmittance shifts farther into the HEV wavelengths, i.e. as concentrations of the absorber increase, so does absorbance of HEV wavelengths. Consequently, in certain embodiments, the effective amounts of the light absorbers employed depends on the manner of application of the absorber within the lens e.g. application as a microns thick laminating adhesive or coating layer, as a fractional millimeter thick monolithic film forming one part of a laminate structure, or as the multi-millimeter thick bulk lens molding material.

The transmittance shift into the HEV wavelengths is significant because, in certain applications of the present invention, the objective is to achieve a lens with maximum transmission and minimum residual color in transmission while also achieving a degree of UV and HEV light blocking. In certain embodiments, the transmittance should be as close as possible to the resin without the introduction of the absorber, for example, approximately less than 80 percent. However, exact values depend upon the thickness of material and are often approximately less than 90 percent for ophthalmic lenses. A residual color of the ophthalmic article can be expressed by color coordinates (x,y, Y or L*a*b*) but, in view of the above objectives, it can be more meaningful to evaluate the optical articles of the present invention in terms of the transmitted yellow index of the lens (YI [1925 C/2]).

The effect of the absorber is to selectively remove portions of the UV and blue spectrum. A consequence of doing this is to increase the appearance of yellow in the lens color. Yellow color is often associated with aging or degradation of objects and is therefore found to be aesthetically displeasing. Hence, in certain embodiments, optical articles according to the present invention have yellow indices of preferably less than 3 but no more than 16. At values below 3, the yellow will not be noticed by most observers. In contrast, values above 16 will be found objectionable by most observers. The acceptance between 3 and 16 will depend on the application and viewing conditions.

The broad range of light absorber structures useful in this invention have different characteristic molar extinction coefficients (a measure of their light absorbing efficiencies). Hence, specification of a generically useful absorber amount by weight percent of composition may seem substantially high in some cases. In certain embodiments, selection of an absorber and the absorber's appropriateness in a given location (related to path length and amount required to absorb the desired amount of light) is optimized. Therefore, the relative phrase "amount sufficient to provide the desired effect" may be more suitable in some cases. For example, the terms $\lambda_{50}$, $\lambda_{10}$, $\lambda_5$ and $\lambda_1$, defined as the wavelength at which transmittance is 50, 10, 5, and 1 percent, respectively, of the incident light at the stated wavelength, can be more useful. Table 1 below numerically expresses certain of the data employed to generate the graph of FIG. 3 according to this scheme (to the nearest whole nm).

TABLE 1

| Tinuvin CarboProtect GEPM Solutions; 1.0 mm Path Length | | | | Tinuvin CarboProtect PU Laminates; 41 μm Path Length | | | |
|---|---|---|---|---|---|---|---|
| $\lambda$, (nm) | 0.1 wt % | 0.2 wt % | 0.4 wt % | $\lambda$ (nm) | 1.0 wt % | 2.0 wt % | 4.0 wt % |
| $\lambda_{50}$ | 422 | 428 | 433 | $\lambda_{50}$ | 419 | 425 | 431 |
| $\lambda_{10}$ | 408 | 416 | 423 | $\lambda_{10}$ | 397 | 411 | 419 |
| $\lambda_5$ | 403 | 413 | 420 | $\lambda_5$ | 385 | 407 | 415 |
| $\lambda_1$ | 392 | 407 | 416 | $\lambda_1$ | n/a | 396 | 410 |

Figure 4:
FIG. 4 is a partial cross-sectional view of an optical article according to certain embodiments of the present invention.

In certain embodiments, as shown in FIG. 4, a light-absorbing laminate or monolithic film 10 according to the present invention is placed into a mold cavity and a composite lens 12 is formed via injection molding of a molten thermoplastic resin 14 into the mold cavity containing the light-absorbing laminate or monolithic sheet. Detailed descriptions of exemplary injection molding processes are provided in the U.S. Pat. Nos. 5,757,459; 5,856,860; 5,827,614; 6,328,446; 6,814,896; 7,048,997; and 8,029,705, which are hereby incorporated herein by reference in their entireties.

Figure 5:
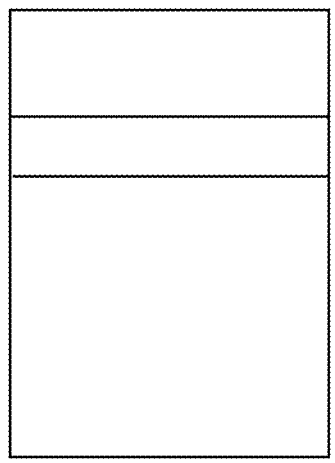
FIG. 5 is a partial cross-sectional view of an optical article according to certain embodiments of the present invention.

In another embodiment, as shown in FIG. 5, a light-absorbing laminate or monolithic film 10 according to the present invention is placed into a mold cavity and a composite lens 18 is formed via casting, wherein the mold cavity containing the laminate or monolithic film is filled with a curable composition 16, for example a composition employing a liquid monomer mixture or a urethane based prepolymer composition (e.g. Trivex, PPG; CAS #97-23-4), followed by curing of the composition to produce the composite lens 12. Detailed descriptions of exemplary casting processes are provided in the U.S. Pat. Nos. 7,858,001 and 8,367,211, which are hereby incorporated herein by reference in their entireties.

Figure 6:
FIG. 6 is a partial cross-sectional view of an optical article according to certain embodiments of the present invention.
Figure 7:
FIG. 7 is a partial cross-sectional view of an optical article according to certain embodiments of the present invention.

In another embodiment of the present invention, a light-absorbing compound(s) is added to, mixed with, or otherwise combined with thermoplastic pellets used for injection molding a lens 20 (FIG. 6) or a portion of a curable composition 22, for example a composition employing a liquid monomer mixture or a urethane based prepolymer composition (e.g. Trivex, PPG) used for casting a lens (FIG. 7).

Figure 8:
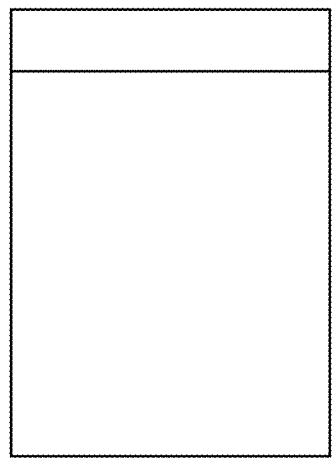
FIG. 8 is a partial cross-sectional view of an optical article according to certain embodiments of the present invention.

In certain embodiments of the present invention, as shown in FIG. 8, light absorbing material or materials or compounds are added to, mixed with, or otherwise combined with a liquid applied hard coating 26 that is applied to the molded or cast lens 24.

Figure 9:
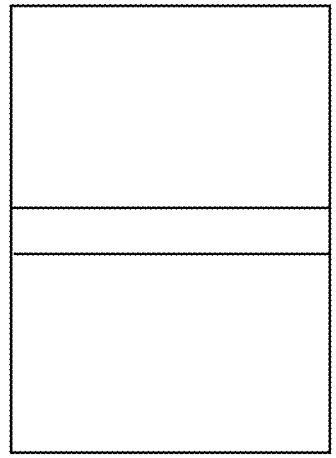
FIG. 9 is a partial cross-sectional view of an optical article according to certain embodiments of the present invention.

In certain embodiments of the present invention, as shown in FIG. 9, a light-absorbing compound(s) is added to, mixed with, or otherwise combined with a carrier composition, e.g. a polyurethane adhesive carrier, that is employed to form a light absorbing layer 30 and the light absorbing layer 30 is laminated between to transparent monolithic films 32, e.g. between two polycarbonate films, to form a light absorbing laminate 34.

There are no limitations placed on the number of absorbers that can be used together, nor their locations when used in combination in composite lenses. Thus, different absorbing materials may be added to the adhesive in a laminate and the lens body material, analogous to FIG. 4 for injection molded composite lenses (and correspondingly for cast composite lenses as shown in FIG. 5). Likewise, the laminate may contain different absorbing materials in the adhesive and in the films laminated together, as well as in the body of the composite lens formed by injection molding or casting.

In certain embodiments of the present invention, an UV/HEV activated (photochromic) dye or dyes are employed in a photochromic adhesive layer 40 within a laminate 42 and one or more UV/HEV light absorbers is employed in a monolithic film 44 of the laminate structure on a side 46 opposite from the incident light, adjacent to the body of the lens, closest to the observer's eye behind the lens or ophthalmic article. FIG. 15 shows a composite lens 12 formed of such a photochromic, light-absorbing laminate 42 via injection molding of a molten thermoplastic resin 14 into the mold cavity containing the light-absorbing laminate 42. FIG. 16 shows a composite lens 18 formed of a photochromic, light-absorbing laminate 42 via casting, wherein the mold cavity containing the laminate 42 is filled with a curable composition 16, for example a composition employing a liquid monomer mixture or a urethane based prepolymer composition (e.g. Trivex, PPG; CAS #97-23-4), followed by curing of the composition to produce the composite lens 18.

In certain embodiments, an ophthalmic lens according to the present invention absorbs up to 99.9% of all light at wavelengths less than 440 nm.

In certain embodiments, an ophthalmic lens according to the present invention absorbs up to 99.9% of all light at wavelengths less than 420 nm.

In certain embodiments, an ophthalmic lens according to the present invention absorbs up to 99.9% of all light at wavelengths less than 400 nm.

In certain embodiments, an ophthalmic lens according to the present invention absorbs up to 99.9% of all light at wavelengths less than 440, 420, or 400 nm. The light is absorbed by additives present in a component of the lens construction, including (1) as a component within an adhesive layer in a laminate contained within a composite lens; (2) as a component within a monolithic sheet or film employed by itself or alone within a composite lens; (3) as a component within a monolithic sheet or film employed as part of a laminate structure contained within a composite lens; (4) as a component added to thermoplastic pellets from which lenses are molded; and/or (5) as a component added to thermoset or curable compositions, for example a composition employing a liquid monomer mixture or a urethane based prepolymer composition (e.g. Trivex, PPG) from which lenses are cast. Detailed descriptions of adhesive layers in laminates are provided in the U.S. Pat. Nos. 8,906,183; 8,298,671; 9,163,108; 9,081,130; and 9,440,019, which are hereby incorporated herein by reference in their entireties.

In certain embodiments, a laminate or a monolithic film according to the present invention absorbs up to 99.9% of all light at wavelengths less than 440, 420, or 400 nm, and the inventive light-absorbing laminate or monolithic film is placed into a mold cavity and a composite lens is formed through injection molding of a molten thermoplastic resin into the mold cavity containing the light-absorbing laminate or monolithic film.

In certain embodiments, a laminate or monolithic film according to the present invention absorbs up to 99.9% of all light at wavelengths less than 440, 420, or 400 nm, and the inventive light-absorbing laminate or the monolithic film is placed into a mold cavity and a composite lens is formed through casting wherein the mold cavity containing the laminate or monolithic film is filled with a curable composition, for example a composition employing a liquid monomer mixture or a urethane based prepolymer composition (e.g. Trivex, PPG), followed by curing of the curable composition to produce the composite lens.

In certain embodiments, an ophthalmic lens according to the present invention absorbs up to 99.9% of all light at wavelengths less than 440, 420, or 400 nm, wherein the thermoplastic pellets used for injection molding or the liquid thermoset or curable composition, for example a composition employing a liquid monomer mixture or a urethane based prepolymer composition (e.g. Trivex, PPG), used for casting the lenses contains the light-absorbing compounds.

In certain embodiments of the present invention the light absorbing material or materials employed to form any of the above-described light-absorbing laminate, monolithic film, and/or ophthalmic lens are absorbers which reversibly transfer hydrogen atoms or protons in the excited state to a neighboring heteroatom.

In certain embodiments of the present invention the light absorbing material or materials employed to form any of the above-described light-absorbing laminate, monolithic film, and/or ophthalmic lens are absorbers which reversibly transfer hydrogen atoms or protons in the excited state to a neighboring heteroatom wherein the hydrogen atom or proton is transferred to oxygen or nitrogen.

In certain embodiments of the present invention the light absorbing material or materials employed to form any of the above-described light-absorbing laminate, monolithic film, and/or ophthalmic lens are absorbers used at a weight percent of up to one in a transparent material having an optical path length greater than 1 mm.

In certain embodiments of the present invention the light absorbing material or materials employed to form any of the above-described light-absorbing laminate, monolithic film, and/or ophthalmic lens are absorbers used at a weight percent of up to three in a transparent material having an optical path length in the range of 0.1 mm and 1 mm.

In certain embodiments of the present invention the light absorbing material or materials employed to form any of the above-described light-absorbing laminate, monolithic film, and/or ophthalmic lens are absorbers used at a weight percent of up to ten in a transparent material having an optical path length in the range of 0.01 mm and 0.1 mm.

In certain embodiments, the light-absorbing laminate, monolithic film, and/or ophthalmic lens of the present invention employ additional functional properties, including but not limited to, coloration, tinting, hard coating, polarization, photochromism, electrochromism, UV absorption, narrow band filtering, easy-cleaning, hydrophobicity, and antistatic. Such functional properties are imparted through a coating or surface treatment of the inventive light absorbing laminate or monolithic film employed alone or as structure contained within a composite lens and/or ophthalmic lens. Alternatively, such functional properties are imparted as a component within an adhesive or protective layer of the laminate; as a component within the monolithic sheet or film; as a component added to thermoplastic pellets from which lenses are molded; and/or as a component added to curable compositions, for example a composition employing a liquid monomer mixture or a urethane based prepolymer composition (e.g. Trivex, PPG), from which lenses are cast.

As used herein, the term curable composition or compositions includes, but is not limited to, compositions curable through application of thermal energy, UV radiation, electron beam, x-ray, gamma-ray, microwave, and/or radio frequency.

In certain embodiments of the present invention, a combination of one or more of the above-described embodiments is employed to absorb an amount of light desired in a spectral region required to meet lens performance specifications.

EXAMPLES

General Procedure: A two-part solvent-borne polyurethane laminating adhesive was prepared from solutions comprising an isocyanate prepolymer, a polyol, a crosslinker and one or more absorbers at various concentrations. The absorbing adhesive solutions were cast onto a release liner at a wet film thickness sufficient to produce a 41 micrometre, plus or minus 2 micrometres, dry adhesive layer and dried for a time and temperature sufficient to remove the volatile solvent (tetrahydrofuran, THF) to less than or equal to 100 mg/m$^2$. The dried adhesive layer was transferred to a first polycarbonate optical film and then laminated to a second polycarbonate optical film to make a three-layer laminate structure. The laminates' absorbing characteristics were observed using a UV-vis spectrophotometer (Hunter, Agilent or Perkin-Elmer). Some of the laminates were used to fabricate composite lenses by injection molding using thermoplastic polycarbonate resin pellets.

Example 1

Figure 10:
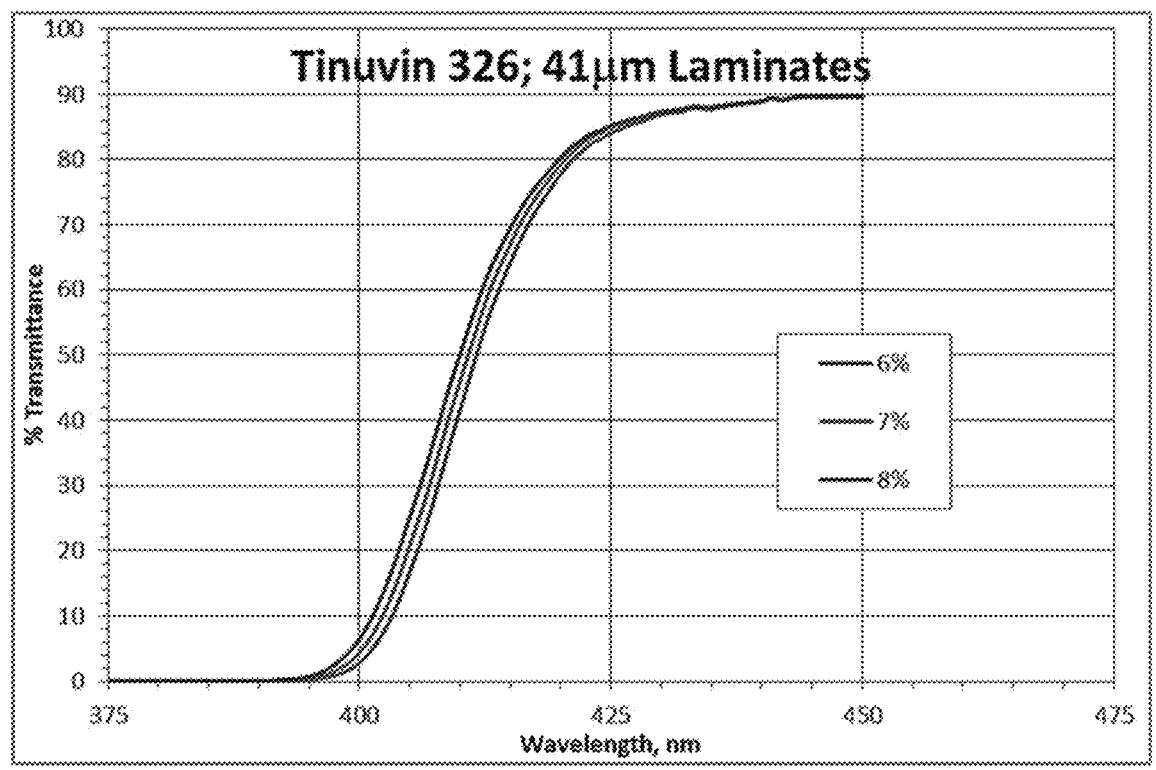
FIG. 10 is a graph showing percent transmittance of laminates containing various concentrations of a light absorbing compound according to certain embodiments of the present invention.

Tinuvin 326 (BASF) was dissolved in THF and added to the two-part solvent borne polyurethane adhesive solution in amounts sufficient to produce adhesive solutions containing a weight percent of 6, 7, and 8, based on final dried adhesive solids, cast onto release liners, dried, and laminated to produce the experimental laminates. Portions of these laminates were placed into a UV-vis spectrophotometer for spectral characterization, as shown in FIG. 10 and summarized below in Table 2.

TABLE 2

Tinuvin 326; 41 μm Laminates

| λ (nm) | 6% | 7% | 8% |
|---|---|---|---|
| $\lambda_{50}$ | 410 | 411 | 412 |
| $\lambda_{10}$ | 401 | 402 | 403 |
| $\lambda_{5}$ | 399 | 400 | 401 |
| $\lambda_{1}$ | 395 | 397 | 398 |

Example 2

Figure 11:
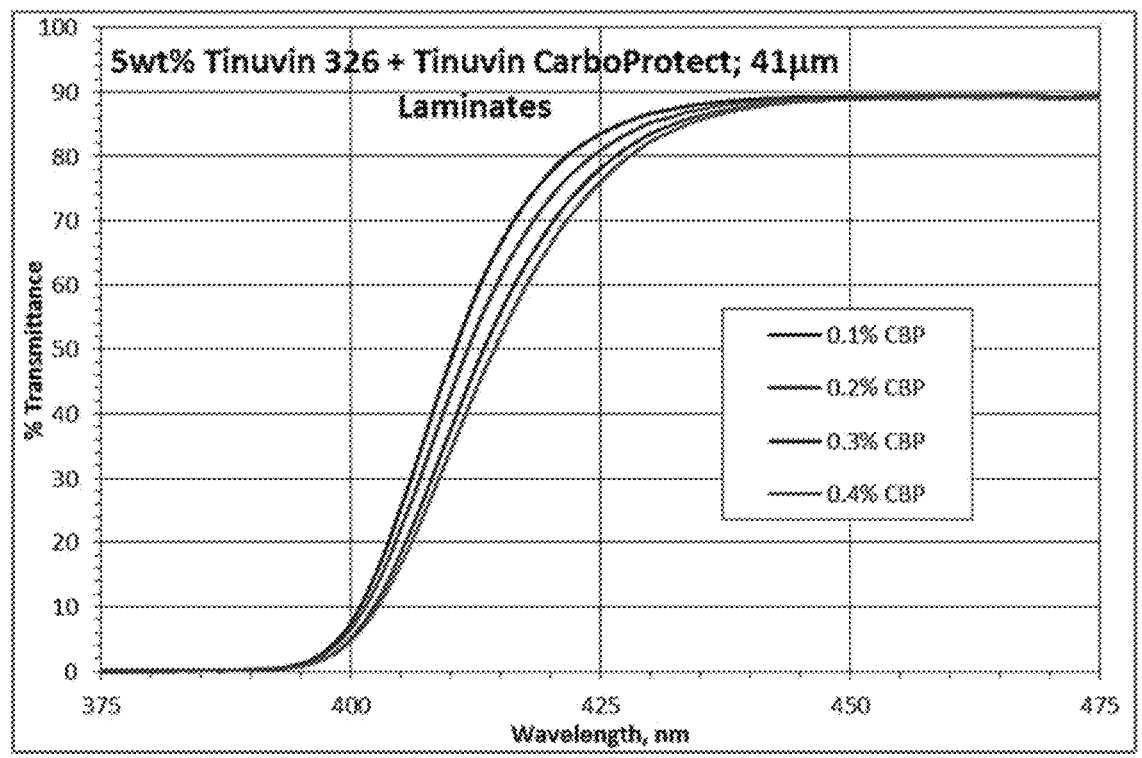
FIG. 11 is a graph showing percent transmittance of laminates containing various concentrations of light absorbing compounds according to certain embodiments of the present invention.

Similar to Example 1, THF solutions containing both Tinuvin 326 and Tinuvin CarboProtect (BASF) were added to the two-part adhesive to provide the absorbers in the amounts indicated based on the dried adhesive solids, which adhesive solutions were cast onto release liners, dried, and laminated to produce experimental laminates with a dried adhesive layer of 41 micrometres. Portions of these laminates were placed into a UV-vis spectrophotometer for spectral characterization, as shown in FIG. 11 and summarized below in Table 3.

TABLE 3

5% Tinuvin 326 + CarboProtect; 41 μm Laminates

| λ (nm) | 0.1 wt % | 0.2 wt % | 0.3 wt % | 0.4 wt % |
|---|---|---|---|---|
| $\lambda_{50}$ | 410 | 412 | 413 | 414 |
| $\lambda_{10}$ | 401 | 402 | 402 | 403 |
| $\lambda_{5}$ | 399 | 399 | 400 | 400 |
| $\lambda_{1}$ | 395 | 395 | 396 | 396 |

Example 3

Figure 12:
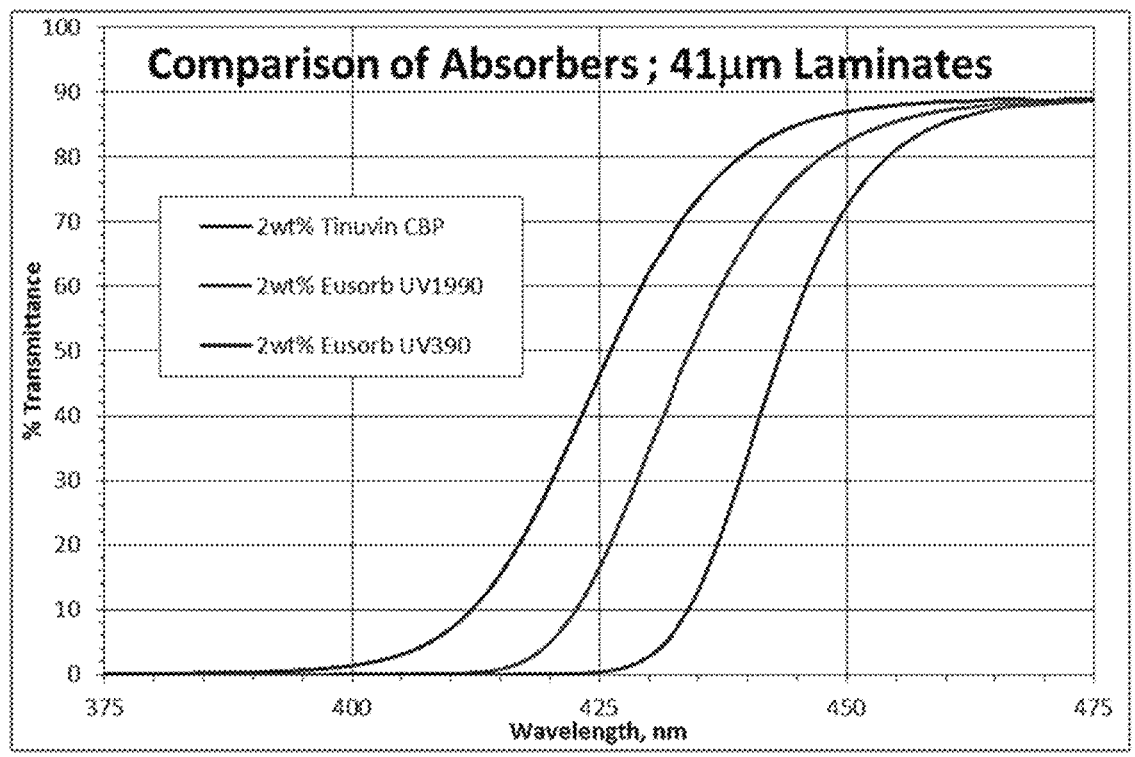
FIG. 12 is a graph showing percent transmittance of laminates containing various concentrations of light absorbing compounds according to certain embodiments of the present invention.

Similar to Example 1, THF solutions containing Tinuvin CarboProtect ("TCBP"; BASF), Eusorb 390 ("UV390"; a proprietary heterocyclic styrene derivative, Eutec) or Eusorb 1990 ("UV1990"; a proprietary acrylic ester derivative, Eutec) were added to the two-part adhesive to provide all the absorbers at a weight percent of 2, based on the dried adhesive solids. These adhesive solutions were cast onto release liners, dried, and laminated to produce experimental laminates with a dried adhesive layer of 41 micrometers. Portions of these laminates were placed into a UV-vis spectrophotometer for spectral characterization, as shown in FIG. 12 and summarized below in Table 4.

TABLE 4

Different Absorbers, 41 μm Laminates

| λ (nm) | UV390 | UV1990 | TCBP |
|---|---|---|---|
| $\lambda_{50}$ | 443 | 434 | 426 |
| $\lambda_{10}$ | 434 | 423 | 412 |
| $\lambda_{5}$ | 432 | 420 | 408 |
| $\lambda_{1}$ | 427 | 415 | 398 |

Example 4

Figure 13:
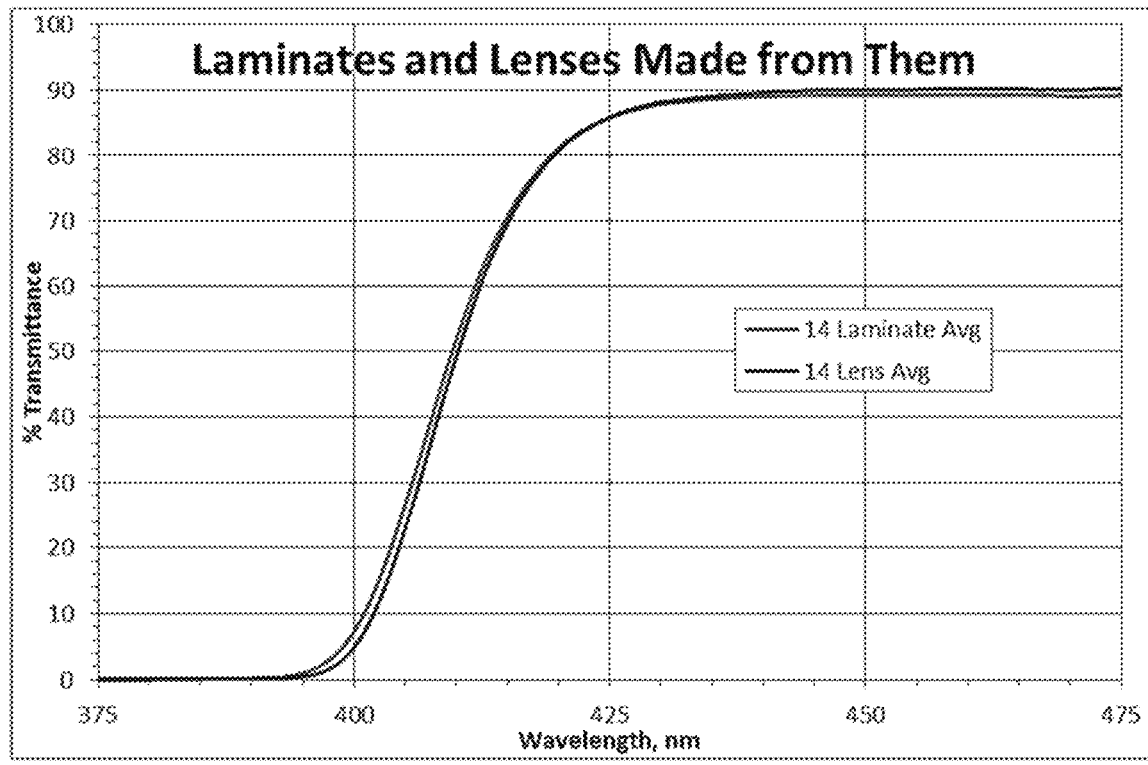
FIG. 13 is a graph showing percent transmittance of light for laminates containing a light absorbing compound and for lenses employing the same according to certain embodiments of the present invention.

Similar to Example 1, a THF solution containing Tinuvin 326 (BASF) was added to the two-part adhesive to provide the absorber at a weight percent of 6, based on the dried adhesive solids. The adhesive solution was cast onto release liners, dried, and laminated to produce experimental laminates with a dried adhesive layer of 41 micrometers. Wafers were punched from some of the laminates, which were placed into molds and fabricated as composite lenses. Laminates and lenses were characterized by UV-vis spectra, with the results shown in FIGS. 13 and 14 and below in Table 5.

TABLE 5

Averages of 14 Pieces

| λ (nm) | Laminate | Lens |
|---|---|---|
| $\lambda_{50}$ | 410 | 410 |
| $\lambda_{10}$ | 401 | 402 |
| $\lambda_{5}$ | 399 | 400 |
| $\lambda_{1}$ | 395 | 397 |

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A laminate of an eye-glass lens comprising:
   a light absorbing layer containing a weight percentage of one or more light absorbing compounds disposed between a first optical film and a second optical film;
   wherein said weight percentage of said one or more light absorbing compounds is related to a thickness of the light absorbing layer to obtain at least a transmittance value of no more than 50 percent for wavelengths in a range of 405 nm to 415 nm;
   wherein a yellow index of said eye-glass lens is less than or equal to 16.

2. The laminate of claim 1, wherein the light absorbing layer containing one or more light absorbers comprises a polyurethane based adhesive layer.

3. The laminate of claim 2, wherein the polyurethane based adhesive layer comprises an isocyanate prepolymer, a polyol and a crosslinker.

4. The laminate of claim 1, wherein the first optical film and the second optical film comprise a polycarbonate optical film.

5. The laminate of claim 1, wherein
   i) said light absorbing layer having said thickness of 1 mm, and said weight percent of said one or more light absorbing compounds is in a range of 0.2 to 0.4, the transmittance value of no more than 50 percent is obtained in a range of 407 nm to 415 nm; or ii) said light absorbing layer having said thickness of 0.041 mm, and said weight percentage of said one or more light absorbing compounds is in a range of 0.2 to 2.0, the transmittance value of no more than 50 percent is obtained in a range of 407 nm to 415 nm.

6. The laminate of claim 5, wherein said light absorbing layer having said thickness is 1 mm, said weight percent of said one or more light absorbing compounds is 0.2, the transmittance value of no more than 50 percent is obtained in a range of 407 nm to 415 nm.

7. The laminate of claim 5, wherein said light absorbing layer having said thickness is about 0.041 mm, said weight percent of said one or more light absorbing compounds is 2, the transmittance value of no more than 50 percent is obtained in a range of 407 nm to 411 nm.

8. The laminate of claim 1, wherein the light absorbing layer is a monolithic film.

9. An eyeglass lens comprising:
a laminate having a polyurethane based adhesive layer containing a weight percentage of one or more light absorbing compounds which is disposed between a first optical film and a second optical film to form a three-layer structure of the laminate;
wherein the three-layer structure of the laminate obtains at least a transmittance of no more than 1 to 50 percent for wavelengths in a range of 405 nm to 415 nm, when said weight percentage of said one or more light absorbing compounds is related to a thickness of the polyurethane based adhesive layer.

10. The eyeglass lens of claim 9, wherein the eyeglass lens is configured to form through an injection molding of a molten thermoplastic on to the laminate.

11. The eyeglass lens of claim 9, wherein said polyurethane based adhesive layer containing one or more light absorbing compounds is a monolithic film.

12. The eyeglass lens of claim 9, wherein
i) said polyurethane based adhesive layer having said thickness of 1 mm, and said weight percent of said one or more light absorbing compounds is in a range of 0.2 to 0.4, the transmittance of no more than 50 percent is obtained in a range of 407 nm to 415 nm; or
ii) said polyurethane based adhesive layer having said thickness of about 0.041 mm, said weight percentage of said one or more light absorbing compounds is 0.2 to 2.0, the transmittance of no more than 50 percent is obtained in a range of 407 nm to 415 nm.

13. The eyeglass lens of claim 9, wherein the polyurethane based adhesive layer is a component of a composite ophthalmic lens.

14. The eyeglass lens of claim 9, wherein the polyurethane based adhesive layer is a thermoplastic resin.

15. The eyeglass lens of claim 9, wherein the polyurethane based adhesive layer comprises a curable composition.

16. The eyeglass lens of claim 9, wherein the laminate obtains at least a transmittance value in a range of 5 to 50 percent.

* * * * *